(12) United States Patent
McCoull et al.

(10) Patent No.: US 8,827,802 B2
(45) Date of Patent: Sep. 9, 2014

(54) ELECTRONIC GAMING MACHINE INCLUDING A SMARTCARD FOR PROTECTION, AND METHOD OF USE

(75) Inventors: James Ross McCoull, St. Peters (AU); Robert Linley Muir, Artamon (AU)

(73) Assignee: Aristocrat Technologies Australia Pty Ltd (AU)

( * ) Notice: Subject to any disclaimer, the term of this patent is extended or adjusted under 35 U.S.C. 154(b) by 1151 days.

(21) Appl. No.: 11/777,193

(22) Filed: Jul. 12, 2007
(Under 37 CFR 1.47)

(65) Prior Publication Data
US 2009/0191961 A1 Jul. 30, 2009

(51) Int. Cl.
*A63F 9/24* (2006.01)
*G06F 21/12* (2013.01)
*G07F 17/32* (2006.01)

(52) U.S. Cl.
CPC .............. *G07F 17/32* (2013.01); *G06F 21/123* (2013.01); *G06F 2221/2109* (2013.01); *G07F 17/3241* (2013.01)
USPC .................................. 463/29; 463/16; 463/20

(58) Field of Classification Search
CPC .......................... G07F 17/3241; G07F 17/3269
USPC ................................................. 463/16–20, 29
See application file for complete search history.

(56) References Cited

U.S. PATENT DOCUMENTS

| | | | |
|---|---|---|---|
| 5,276,312 A * | 1/1994 | McCarthy | 463/26 |
| 6,149,522 A * | 11/2000 | Alcorn et al. | 463/29 |
| 6,439,996 B2 * | 8/2002 | LeMay et al. | 463/29 |
| 6,722,986 B1 * | 4/2004 | Lyons et al. | 463/29 |
| 7,116,782 B2 * | 10/2006 | Jackson et al. | 380/251 |
| 7,316,616 B2 * | 1/2008 | Oberberger | 463/29 |
| 7,467,404 B2 * | 12/2008 | McAllister et al. | 726/9 |
| 7,549,922 B2 * | 6/2009 | Falvey et al. | 463/29 |
| 2003/0135756 A1 * | 7/2003 | Verma | 713/201 |
| 2003/0203755 A1 * | 10/2003 | Jackson | 463/42 |
| 2005/0138387 A1 * | 6/2005 | Lam et al. | 713/185 |
| 2006/0079322 A1 * | 4/2006 | Itskov et al. | 463/29 |
| 2006/0100010 A1 | 5/2006 | Gatto et al. | |
| 2006/0211490 A1 * | 9/2006 | Falvey et al. | 463/29 |
| 2006/0245564 A1 * | 11/2006 | Li et al. | 379/114.02 |
| 2006/0247020 A1 * | 11/2006 | Fujimori | 463/22 |
| 2006/0287109 A1 * | 12/2006 | Mercado et al. | 463/43 |
| 2009/0017896 A1 * | 1/2009 | Page | 463/20 |

OTHER PUBLICATIONS

European Search Report corresponding to European Patent Application Serial No. 07112425.9-1238, completed Jan. 28, 2008, 6 pages.

* cited by examiner

*Primary Examiner* — Dmitry Suhol
*Assistant Examiner* — Jay Trent Liddle
(74) *Attorney, Agent, or Firm* — McAndrews, Held & Malloy, Ltd.

(57) ABSTRACT

A method of protecting game program code of an electronic gaming machine (EGM) comprising: determining prior to execution of the game program code whether there is a dongle in data communication with the EGM that contains a valid game token corresponding to the game program code; and taking at least one protective action if a valid game token is not located.

26 Claims, 9 Drawing Sheets

ELECTRONIC GAMING MACHINE INCLUDING A SMARTCARD FOR PROTECTION, AND METHOD OF USE

CROSS-REFERENCE TO RELATED APPLICATIONS

The present application relates to, and claims priority from, U.S. application Ser. No. 10/089,759, which claims priority as a national phase application of PCT/AU00/01192, which are herein incorporated by reference in their entirety. The present application also relates to, and claims priority from, Australian Patent Application No. 2006903776, filed Jul. 13, 2006, and Australian Patent Application No. 2006907047, filed Dec. 18, 2006, which are herein incorporated by reference in their entirety.

FIELD

This disclosure relates to a method of protecting game program code of an electronic gaming machine, an electronic gaming machine, a method of controlling release of game program, and a method of allowing development on an electronic game machine.

BACKGROUND TO THE INVENTION

In the gaming industry, a significant amount of money is invested in the development of games to be played on electronic gaming machines. In recent times, there has been a move to develop modular gaming machines which can execute program code for any game. A requirement of such machines is that the code be readily loadable onto the gaming machine. This approach, while helpful as far as improving modularity and reducing the capital cost of providing gaming machines, creates a security risk.

SUMMARY OF THE INVENTION

In a first aspect, there is disclosed a method of protecting game program code of an electronic gaming machine (EGM) comprising:
 determining prior to execution of the game program code whether there is a dongle in data communication with the EGM that contains a valid game token corresponding to the game program code; and
 taking at least one protective action if a valid game token is not located.

In an embodiment, the protective action is to prevent execution of the game program code.

In an embodiment, the method involves periodically altering a counter on the dongle associated with the game token wherein the game token remains valid until the counter reaches a predetermined value to thereby control the lifetime of the game token.

In an embodiment, determining whether there is a dongle in data communication with the EGM that contains a valid game token includes determining whether the dongle is valid.

In an embodiment, determining whether the dongle is valid comprises:
 obtaining from the dongle a dongle public key and a dongle signature of the dongle public key encrypted with a master private key;
 decrypting the dongle signature with a master public key; and
 determining based on a comparison of the decrypted dongle signature with the dongle public key whether the dongle is valid.

In an embodiment, determining whether a game token is valid comprises:
 sending a game ID to the dongle;
 obtaining from the dongle game data of the game token corresponding to the game ID;
 obtaining from the dongle a game signature of the game ID and the game data encrypted with the dongle private key;
 decrypting the game signature with the dongle public key; and
 determining whether the game token is valid based on a comparison of the decrypted game signature with the game ID and game data.

In an embodiment, the step of determining is performed during a boot operation.

In an embodiment, the boot operation is part of a secure boot process.

In an embodiment, the method is applied to protecting a plurality of game programs stored in a memory of the EGM and the method comprises determining whether there is a dongle that contains a valid game token for each game and taking at least one protective action in respect of each game program for which a valid token is not located and no protective action in respect of each game program for which a valid token is located.

In an embodiment, the dongle comprises a smart card.

There is also disclosed an electronic gaming machine comprising:
 a memory storing one or more game programs; and
 a main circuit in data communication with the memory and arranged to determine prior to execution of a game program of the one or more game programs whether the main circuit is in data communication with a dongle containing a valid token for the game program and further arranged to take at least one protective action in respect of the game program if a dongle containing a valid token is not located.

In an embodiment, the main circuit is adapted to have a plurality of dongles connected thereto.

In an embodiment, the main circuit is adapted to determine whether there is a dongle with a valid token for each game during a boot operation of the main circuit.

There is also disclosed a method of protecting game program code of an electronic gaming machine (EGM) comprising:
 providing a plurality of game programs in the memory of the EGM;
 connecting a plurality of dongles to the EGM, each corresponding to one game program of the plurality of game programs; and
 taking at least one protective action in respect of execution of any game program that does not have a corresponding dongle connected to the EGM.

There is also disclosed a method of controlling release of game programs of an electronic gaming machine (EGM) comprising:
 providing a plurality of game programs in the memory of the EGM; and
 requiring an operator of the EGM to obtain a dongle having a game token corresponding to each of the game programs the operator intends to be executed by the EGM and have the dongle or dongles connected to the EGM.

In an embodiment, the method involves requiring the operator to obtain an individual dongle for each game program.

In a second aspect there is disclosed a method of selectively allowing software development on an electronic gaming machine comprising:

performing a boot operation of an electronic gaming machine (EGM);

determining during the boot operation whether there is a dongle in data communication with the EGM that contains a valid developer token; and disabling at least one security function of the EGM when a valid developer token is located.

In an embodiment, the method involves controlling the lifetime of the developer token by periodically altering a counter on the dongle associated with the developer token such that the developer token remains valid until the counter reaches a predetermined value.

Depending on the embodiment, the periodic alteration may be based on expired time, number of executions, etc.

In an embodiment, determining whether a developer token is valid comprises:

sending a developer ID to the dongle;

obtaining, from the dongle, developer data of the developer token corresponding to the developer ID;

obtaining, from the dongle, a developer signature of the developer ID and the developer data encrypted with the dongle private key;

decrypting the developer signature with the dongle public key; and determining whether the developer token is valid based on a comparison of the decrypted developer signature with the developer ID and developer data.

There is also disclosed an electronic gaming machine (EGM) comprising:

a main circuit arranged to determine during a boot operation whether there is a dongle in data communication with the EGM that contains a valid developer token, and further arranged to disable at least one security function of the EGM when a valid developer token is located.

In an embodiment, the EGM is configured to determine whether the developer token is valid at least in part by determining whether a counter on the dongle associated with the token has reached a predetermined value and is further configured to periodically alter the counter to thereby control the lifetime of the dongle.

In a third aspect there is disclosed a method of selectively controlling software on an electronic gaming machine (EGM) comprising:

determining during the boot operation whether there is a dongle in data communication with the EGM that contains a corresponding game token corresponding to the game program code; and determining whether to enable at least one feature of the game program code based on content of any located corresponding game token.

There is also disclosed an electronic gaming machine (EGM) comprising:

a main circuit arranged to determine prior to execution of game program code whether there is a dongle in data communication with the EGM that contains a corresponding game token, and further arranged to determine whether to enable at least one feature of the game program code when a valid corresponding game token is located.

In a further aspect there is provided a method of authorizing execution of a game program held in a memory associated with a gaming apparatus, the method comprising:

booting the gaming apparatus using boot code and loading system software in a process that authenticates that the boot code and system software is genuine before allowing the gaming apparatus to execute said game program, wherein if genuine system software is loaded, the system software prevents execution of unauthorized game programs;

receiving at the gaming apparatus a message from a device that potentially authorises use of said game program;

at the gaming apparatus checking the authenticity of the message;

if the message is determined to be authentic, allowing execution of the game program; and if the message is determined not to be authentic preventing execution of the game program.

In a further aspect there is provided a method of controlling use of communications interface of a gaming apparatus, the method comprising booting the gaming apparatus using boot code in a boot process that authenticates the boot code before allowing system code;

as part of the boot process, receiving a message potentially authorising use of said communications interface from a secure device and checking the authenticity of the message;

if the message is determined to be authentic, allowing use of the communications interface; and if the message is determined not to be authentic preventing use of the communications interface.

In a further aspect there is provided a method of authorizing execution of a game program held in a memory associated with a gaming apparatus, the method comprising:

providing a device at the gaming apparatus, the device sending a message to the gaming apparatus that potentially authorises use of said game program;

at the gaming apparatus checking the authenticity of the message;

if the message is determined to be authentic, allowing execution of the game program;

if the message is determined not to be authentic preventing execution of the game program;

receiving identification information of the gaming apparatus at the secure device and tying the secure device to the gaming apparatus so that the secure device can no longer authorise play of the game program on a gaming device with different identification information.

Figure 1:
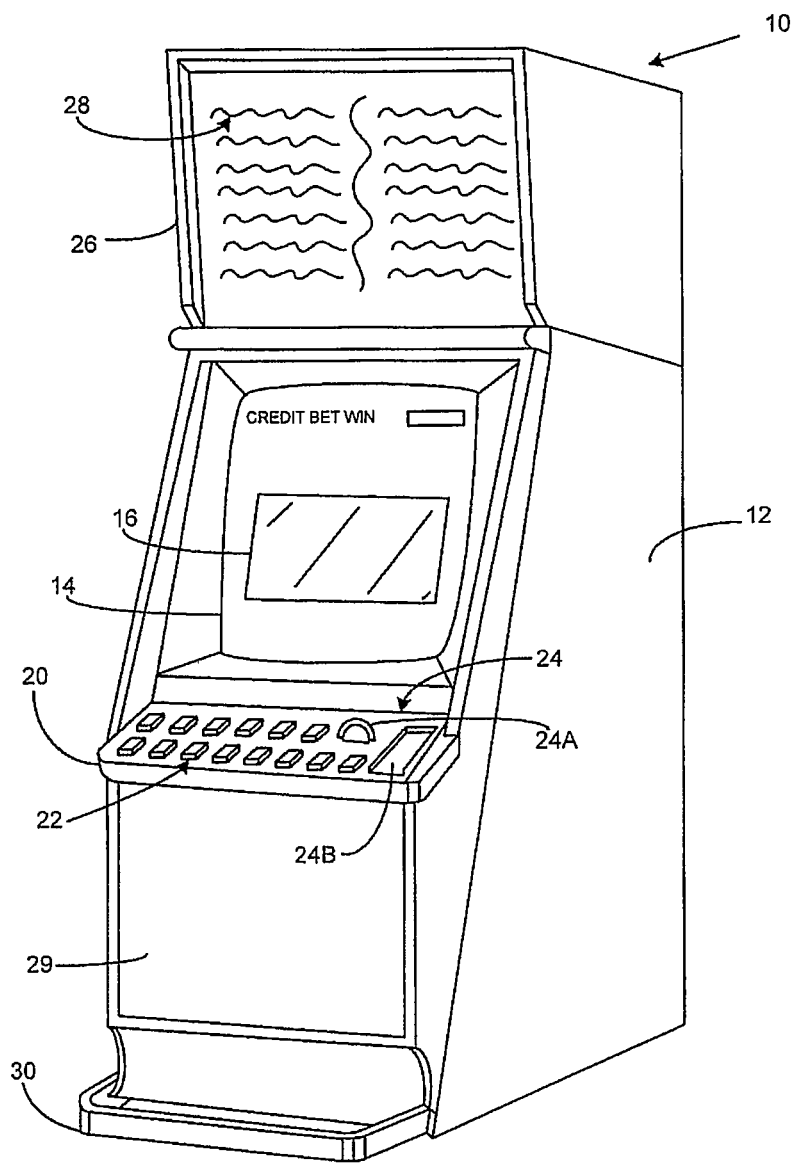
FIG. 1 is an isometric view of a gaming machine.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

First Embodiment

Referring to the drawings, there is shown a gaming machine that employs software protection using tokens stored on a dongle (that is, an electronic device that must be attached to a computing device—in this case the gaming machine—if the device is to use protected software). In an embodiment, the dongle takes the form of a Smartcard in the form of a Smartcard to make it difficult to effectively copy game program code corresponding to a game from one gaming machine to another gaming machine. The approach of using tokens stored on Smartcards is also used to configure the gaming machine for development by disabling at least one security feature of the machine or to control what features of a game are playable on the gaming machine. In an embodiment, the main circuit board of the electronic gaming machine is adapted to receive a plurality of dongles and only one token for an individual game is supplied on each dongle so that a dongle for each game must be attached. In this way, release of a plurality of games stored in memory of the electronic gaming machine can be controlled selectively.

A gaming machine 10 is illustrated in FIG. 1. The gaming machine 10 has a number of components which enable a player to interact with the gaming machine (e.g. to input game instructions, input/output credits, and watch the game), these are referred to collectively as a "player interface" and the components will become apparent from the following description. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during gameplay. The mid-trim 20 also houses a credit input mechanism 24 which in this example includes a coin input chute 24A and a bill collector 24B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 2:
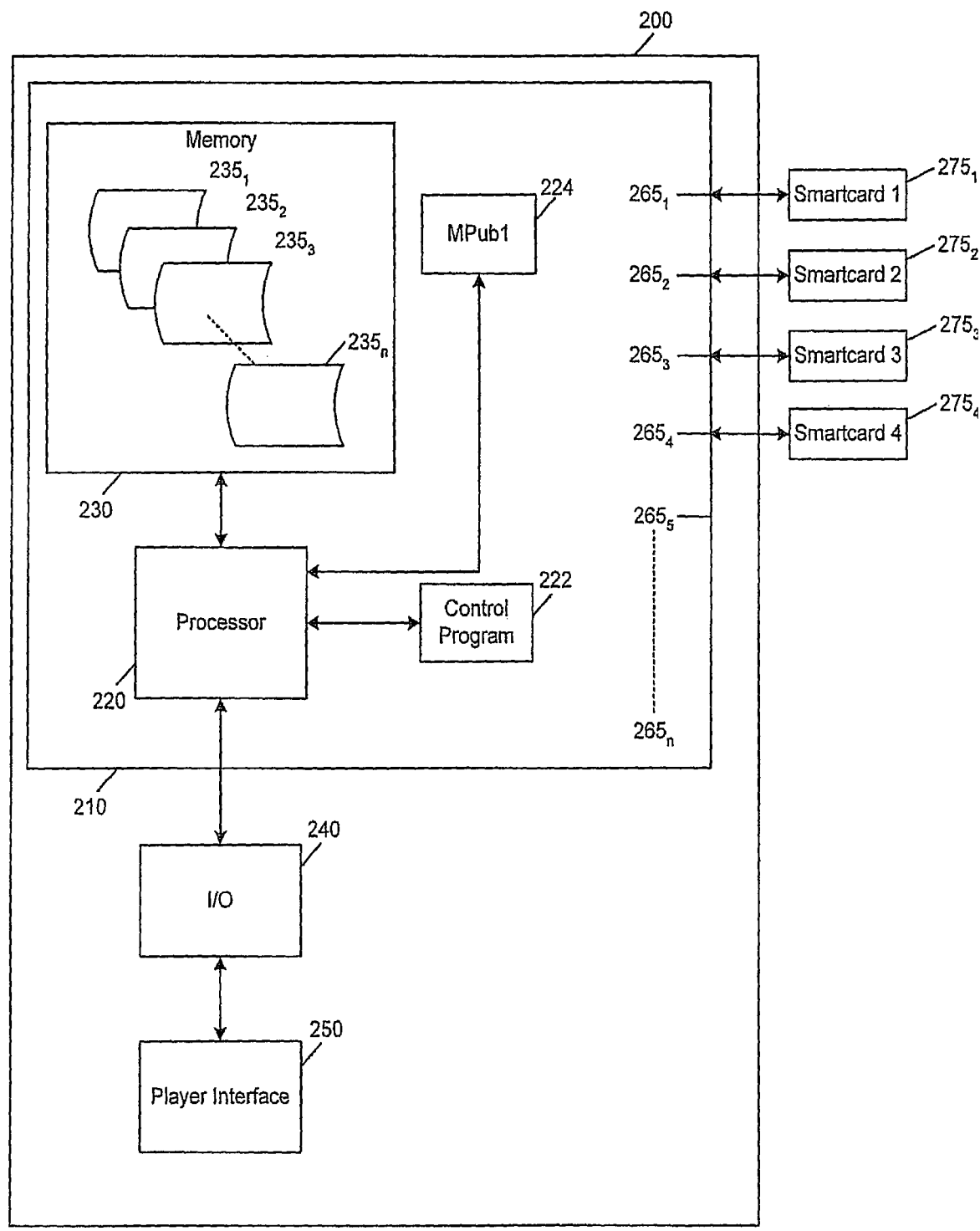
FIG. 2 is a block diagram of a gaming machine.

FIG. 2 is a block diagram illustrating the main components of a gaming machine in accordance with an embodiment. Other components known to persons skilled in the art such as hardware meters are not illustrated for clarity of exposition. The gaming machine 200 has a main circuit in the form of a main circuit board 210 having a main processor 220 and a main memory 230. Herein the term "processor" is used to refer generically to any device that can process instructions and may include: a microprocessor, microcontroller, programmable logic device or other computational device.

The main memory 230 stores the program code 255 for a plurality of games $235_1$-$235_n$ that may be played by a player on the electronic gaming machine (EGM) 200 provided a dongle 275 having a valid token corresponding to the game is connected to the main board 220 by one of slots 265.

Thus, memory 230 may contain as many games $235_1$ to $235_n$ as desired to be delivered on the electronic gaming machine 200. The main circuit board 210 contains a plurality of sockets $265_1$ to $265_n$ (for example 24 sockets) each adapted to have a Smartcard 275 inserted therein to provide a dongle. The EGM communicates with a custom control program on the Smartcard. In order execute any one of the game programs $235_1$ to $235_n$ an appropriate relevant Smartcard must be attached to one of the ports 265. In the example illustrated in FIG. 2 four Smartcards $275_1$-$275_n$ are connected, permitting execution of four different games. That is, in the preferred embodiment, separate Smartcards are provided for each game. This allows a great deal of flexibility, as it is not necessary to rewrite the Smartcard to include all games that need to be offered on the gaming machine 200. Further, an operator may reconfigure an EGM 200 by swapping around Smartcards corresponding to particular games.

It will be appreciated by persons skilled in the art that this provides advantages in controlling release of the games and in configuring gaming machines. However, Smartcards 275 can be configured to carry game tokens for a plurality of different games. For example, a first dongle can be used for a series of standard games available on the gaming machine 200 and additional Smartcards can be required for premium games.

Each Smartcard 275 comprises a CPU 410, a cryptographic accelerator 420, a Smartcard operating system control program 430, a custom application 440, a table of tokens 450 and a key and signature store 460 which stores a unique private and public RSA key pair hereafter referred to as "SCPubX, and SCPrivX" and a signature of SCPubX, (Signature 1) that has been generated at a previous time by encrypting an encoded SHA-1 hash of SCPubX with a private RSA master key (MPriv1) in a secure environment. The table 450 can contain one or a plurality of tokens depending on the embodiment. The table has the fields "game ID" (an identifier e.g. a license name), "game data" (some data for running the game), counter fields and identifier fields.

The electronic gaming machine 200 has a control program 222 and a copy of the public RSA master key MPub1 224.

The process begins with an authentication process 310 where the Smartcard 275 is authenticated as a valid Smartcard. The process begins at start point 311 each time the electronic gaming machine 200 is powered on or reset. The control program of the electronic gaming machine 222 begins execution. At some time before the electronic gaming machine begins executing the game software 235, it begins communication with the Smartcard 275. At step 312, the control program 222 of the EGM requests a key from the Smartcard. The Smartcard reader interface of the electronic gaming machine is configured to establish connection with the Smartcard according to ISO7816.

The electronic gaming machine 200 communicates with the Smartcard and selects the custom application 440. The electronic gaming machine 200 authenticates the Smartcard as a genuine Smartcard by retrieving SCPubX from the Smartcard 275 and Signature 1 from the Smartcard at step 313. At step 314, the EGM decrypts Signature 1 with MPub1 using the RSA algorithm. The EGM then determines whether the decrypted signature matches RSA-1 hash of SCPubX. If it does, the Smartcard is accepted as authentic at step 314 and a valid sign key 315 is forwarded to subsequent processors. If not, an invalid signed key output 361 is generated and then the Smartcard is powered off 360.

The next stage in the process is a license verification stage 320. In this stage, the EGM attempts to retrieve software protection tokens for application specific purposes. The program is initially in a wait state of a main process loop 321. At step 322 the control program makes a license request 322 by requesting a token with a particular game ID. This message is sent encrypted with the public key SCPubX of the Smartcard. A sequence number is also sent as part of this message and is incremented each time the license request is made. At step 323, the license request is verified by decrypting the message and checking the game ID against a stored value to determine if that game ID is in the token and by checking the sequence number. A response is generated at step 324 which increments the sequence number and sends game data from the software protection token together with a signature of game ID and game data by signing the exchanged data of game-ID and game-data with SCPrivX. The EGM 200 then verifies the signed data at step 325 which then allows the game to run.

In Counter process 330, a counter associated with the particular token can be decremented in order to control the lifetime of the token. This is done by sending the game ID (license name) to the decrement counter which decreases a counter stored in the token against the game ID such that when the counter 332 is decreased to zero, the license expires.

Process 340 is an ongoing Smartcard verification. That is, in addition to the initial start up process, where the public key of the Smartcard is obtained and the Smartcard is authenticated, validity of the Smartcard is checked each time there is a transaction by sending 341 a message encrypted with the public key that includes a sequence number. This is processed and decrypted within the Smartcard, and the sequence number is changed before generating a response at step 343 which includes an incremented sequence number and processing the response at step 344 which verifies the signature. Thereby producing a signed outcome at 343 that can be verified. The new sequence number is stored for use in the next Smartcard verification 340. This prevents transaction sharing amongst two Smartcards as if the number is out of sequence, a "valid" message will not be generated at step 343.

The control logic is implemented in process 350, the responses produced from the various processes namely responses 352 and 353 are provided to the internal logic process 351 which determines whether the process is valid. If the process is valid, the internal logic 351 sends a response 355 to the main process loop indicating that the process is valid.

If the logic 351 determines that one of the responses indicates that the Smartcard has been compromised or does not contain a valid token, an invalid signal 356 is outputted to a session ending function 354 which outputs a session end command 362 to power off the Smartcard 360.

Second Embodiment

An extension of the above system has the EGM 200 looking for a particular developer token during its boot sequence before all security functions of the gaming machine have been activated. That is, the processes described are performed by looking for a developer token rather than a game token. In this embodiment, when a developer token is found, the data field that is returned at the equivalent of step 324 is used to selectively disable one or more security features of the electronic gaming machine. This is used to allow software developers to develop on the platform with various aspects of the chain of security disabled. A number of levels of developer Smartcard are possible with different security functions disabled. The counter and identifier fields may be used to limit the lifetime of a developer Smartcard and to lock it to being valid on a single main board only.

While as indicated above the action is usually a protective action to prevent execution of the game by preventing by the control program failing if the Smartcard is powered off due to there being an error, the Smartcard may also be used to cause other actions to occur, for example to enable or disable specific game features defined by the relevant game program code based on the content of the game data.

Third Embodiment

In the gaming market regulators often require that the contents of programmed memory be externally verifiable. This traditionally has been via reading the programmed chip in a commercial device programmer, however it is preferable if this can be performed without removing the device from the board—especially if it has been assembled in such a way that makes this difficult (e.g. surface mount assembly).

A CPU in-circuit emulator may be attached to the board and the device memory contents read via the emulator. An automated verification package may be constructed which automatically drives the emulator to read and compare memory images without providing the full functionality or complexity of an In-Circuit Emulator.

A JTAG (Joint Test Action Group) interface may be used to allow connection of an in-circuit emulator to the board. The JTAG interface is defined by the IEEE standard 1149.1, which is incorporated herein by reference in its entirety. The JTAG interface allows a regulator to serially connect an in-circuit emulator to the CPU, which allows de-bugging to be performed. However, the JTAG interface can also be used to load onto integrated circuit devices and therefore, for at least this reason the JTAG interface also represents a potential weak point of entry to the gaming machine 10.

Figure 5:
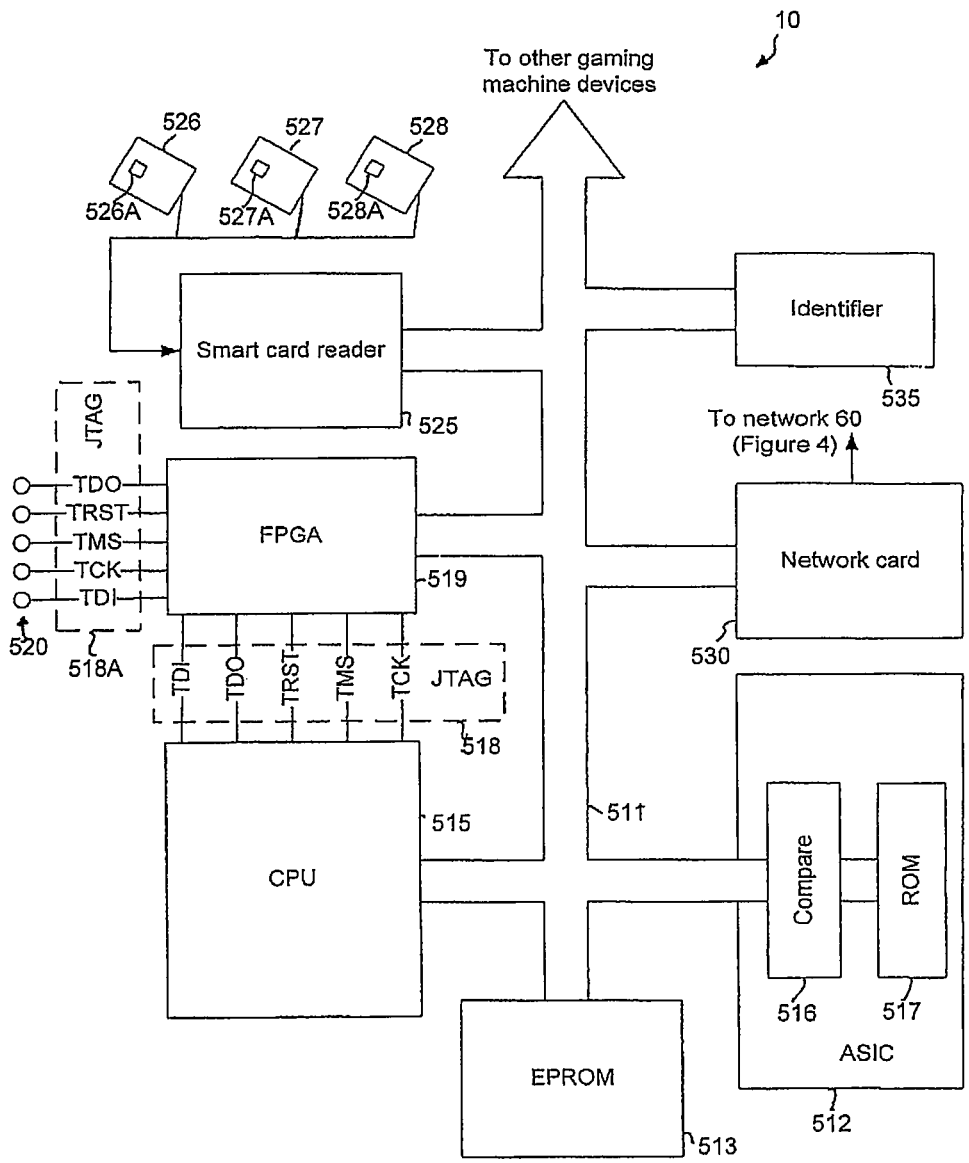
FIG. 5 is a further block diagram of a gaming machine in accordance with an embodiment.

FIG. 5 shows a block diagram of part of the gaming machine 10 shown in FIG. 1 with additional components added to address this problem.

The CPU 515 is shown with a JTAG interface 518. However, instead of connecting to terminals on the circuit board, the JTAG interface 518 is connected to a programmable device, by way of non-limiting example, an FPGA (Field Programmable Gate Array) 519. The terminals 520 connect to the FPGA 519, creating a second JTAG interface 518A that is accessible. The function of the FPGA 519 is to allows or disallow access to the JTAG interface 518, dependent on control signals received from the address and data bus 511, as described herein below. Some additional functions of the gaming system may also be implemented by the FPGA 519, so that the FPGA 519 can not be easily replaced with a device that always enables the JTAG interface 518.

A smart card reader 525 is provided in communication with the address and data bus 511. As is known in the relevant arts, the smart card reader 25 may allow the gaming machine 510 to perform various functions, for example enable player identification and tracking if players are provided with a smart card.

When a regulator requires access to the JTAG interface 518, they insert a regulator smart card 526 including a smart card chip 526A. The smart card 26 contains a private key, which is used to sign a message and place it on the bus 511. The corresponding public key is stored in the EPROM 513 and the CPU 515 uses the public key to verify that the signed message is authentic and notifies the FPGA 519 of this.

The CPU 515 interrogates the smart card reader 525 on start-up and the instructions to cause this are contained in the EPROM 513. The instructions that cause the smart card reader 525 to be interrogated may be protected by a compare function 516 of the ASIC 512, by a subsequent hash check or less preferably by a subsequent signature check, performed following verification of the boot code.

Verification of boot code is the subject of co-pending application entitled "A gaming machine and a method of protecting an electronic gaming machine" the disclosure of which is incorporated herein by reference, filed the same date as this application claiming priority of Australian Patent Application Nos. 2006903776, 2006907047, and 2007903196.

In one exemplary embodiment, the ASIC 512 provides a monitoring device which checks at least a portion of the boot code corresponds to a comparison portion of code stored in ROM 517. In order to authenticate the boot code as genuine. Once authenticated the boot code contains code that allows the system software to be authenticated. Authenticated system software is arranged to conduct checks on game programs to determine whether they are authentic. Further details of the authentication process are available in the corresponding application.

The FPGA 519 receives from the CPU 15 notification of receipt of an authenticated signed message from a regulator smart card 526. In response, the FPGA 519 allows access to the JTAG interface 518 from the JTAG interface 518A. Thus, the smart card provides a secure device for providing a message that authorizes use of the JTAG interface.

Figure 3:
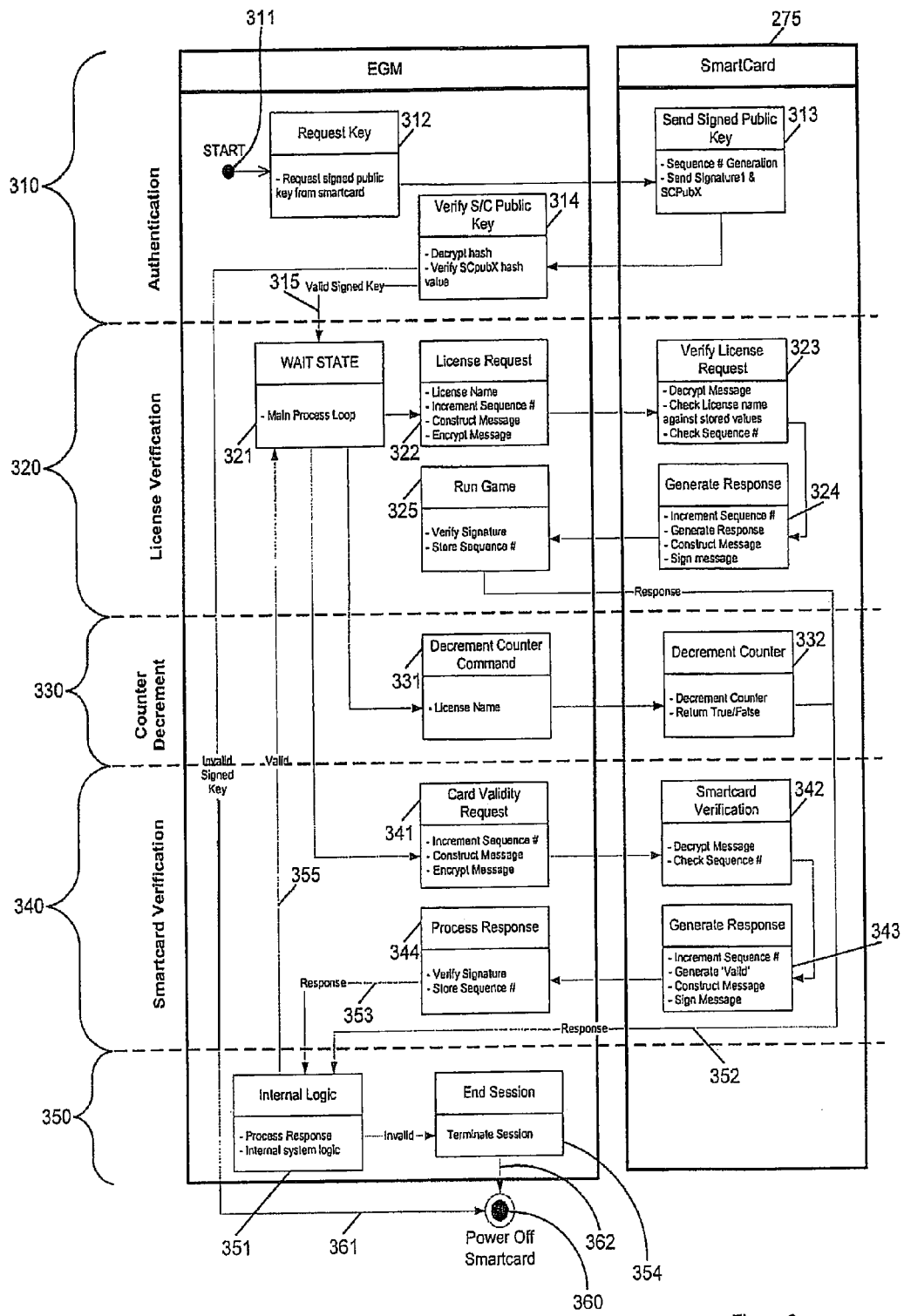
FIG. 3 is a process flow diagram in accordance with an embodiment.
Figure 4:
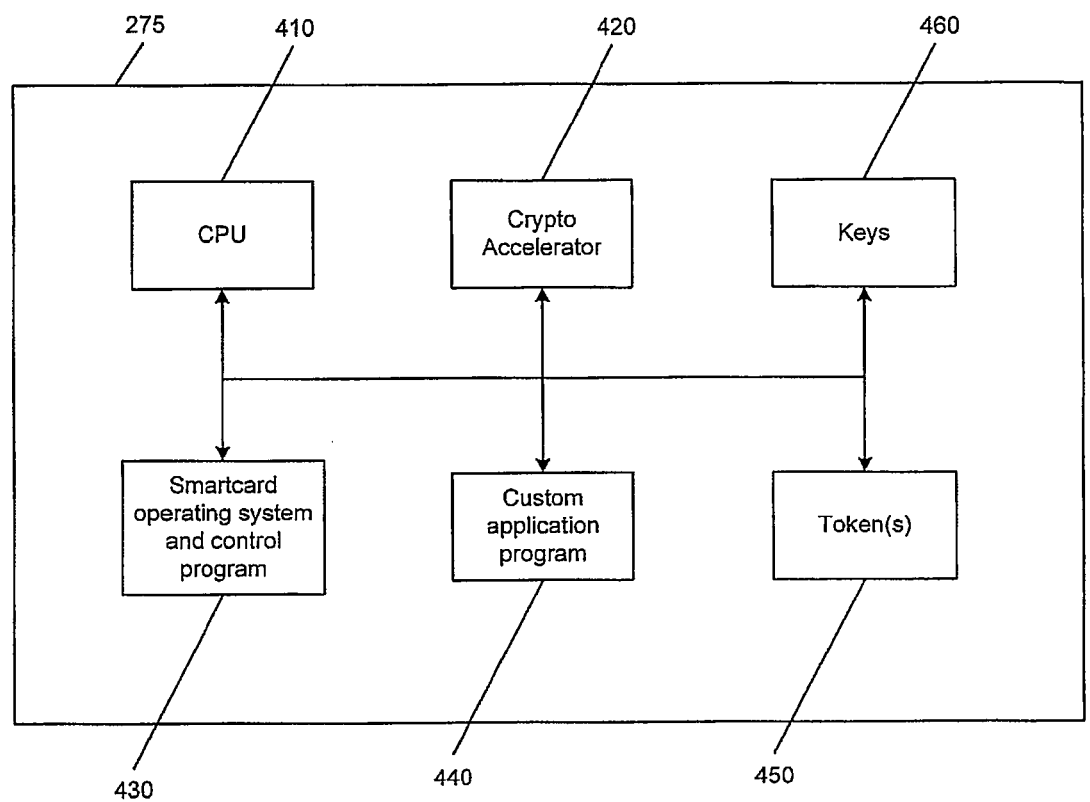
FIG. 4 is a block diagram of a Smartcard in accordance with an embodiment.

While the FPGA 519 and ASIC 512 are shown as separate devices in FIG. 3, they may be implemented in a single programmable device.

Fourth Embodiment

Software development requires that engineers be able to run any code they wish on the gaming machine. It is not desirable to allow software engineers to sign their code with the real product keys, as security would be quickly compromised.

One method of allowing software development in a protected system like the gaming machine 10 is to provide software developers with a developer smart card 527, including a smart card chip 527A. In a similar manner that the regulator smart card 526 allowed access to the JTAG interface 518, the developer smart card 527 provides a signed message to the CPU 515 on start up and in response the CPU 515 allows unsigned program code to be executed, by disabling the signature checking function, which is described in further detail below.

Because the checking of the smart card reader 525 for a regulator smart card 526 or developer smart card 527 only occurs on start-up and the start-up process is protected as described herein above, then it is difficult to tamper with the system so as to make the CPU 515 allow access to the JTAG interface 518 or allow unsigned program code to be executed without a regulator smart card 526 or developer smart card 527. The regulator smart card 526 may also allow unsigned code to be executed by the CPU 515. The regulator smart card 526 and developer smart card 527 may optionally be identical, using the same private keys. Thus, the developer smartcard provides a secure device for providing a message that allows unsigned code to be executed.

Fifth Embodiment

The smartcard interface may also be used to authorize a game to run. The gaming machine operator is provided with a smart card 528 including a smart card chip 528A, which contains authorization to play one or more games. The games may be authorized for a limited period and the smartcard may have to be always present in the machine. When the smartcard is removed the machine detects this within a reasonable period of time and stops the game running. This prevents a single smartcard being used to authorize games on multiple machines.

The advantage of the smartcard in this application is that it will not be possible to make a copy and that it can contain restrictions on game usage.

To authorize a game, the gaming machine sends an authorization request message to the smartcard 528, the request containing the game identification. The smartcard responds with a message either allowing the game or not and the smartcard is also verified as being allowed to authorize games. Preferably the smartcard uses digital signatures to create a signed game authorization message. The gaming machine contains the signature public key and can therefore both check the message and the smartcard.

In order to avoid a repeat play attack, the gaming machine generates a random number and sends this to the smartcard. The smartcard uses the random number to form the signed message and the gaming machines verifies this before game play is authorised.

A single private-public key pair may be used for all programs. This private-public key pair may also be used by the regulator smart card 526 and/or developer smart card 527, although more preferably the keys for a regulator or developer are different from those used to authorise program and data files, such as game programs. Optionally, each jurisdiction may have its own private-public key pair. Because the request for a key is generated by the CPU 515 using protected code the use of the same private key does not adversely affect the security of the system, because if the protection on the boot code was circumvented, then the requirement to interrogate the smart card reader 525 can be removed. One method of protecting the boot code is described herein, although alternatives may also be used.

Individual programs may also have distinct key pairs. In this implementation a smart card may provide to the CPU 515 the public key that is to be used to verify the program signature from the smart card. The gaming machine may have a root public key, used to authenticate the message from the smart card that contains the private and public keys for the particular program.

The smart card 528 may be issued for a specific gaming machine 10, in which case the gaming machine 10 sends its identification information from the identifier 535 to the smart card 528 and the smart card 528 compares this to an identifier stored within the memory, only issuing authorisations if they match. A disadvantage of this is that it requires close monitoring of the location of each individual gaming machine.

To address this problem and still achieve the tying of the smart card 528 to a particular gaming machine 10, in one embodiment of the present invention the smart card 528 is initially issued so as to be able to authorise a game on any gaming machine. After the smart card 528 has been connected to the gaming machine 10 for a period of time, the smart card 528 writes the identification information from the game identifier 535 into memory, after which the smart card 528 can only be used with a gaming machine 10 having that identification information. For example, after a smart card 528 has been used by the gaming machine 10 for a certain duration, for example 5 hours, the smart card 528 then writes the gaming machine identification information from the identifier 535 into its memory. Thus, the smartcard is a secure device tied to the gaming machine.

Figure 6:
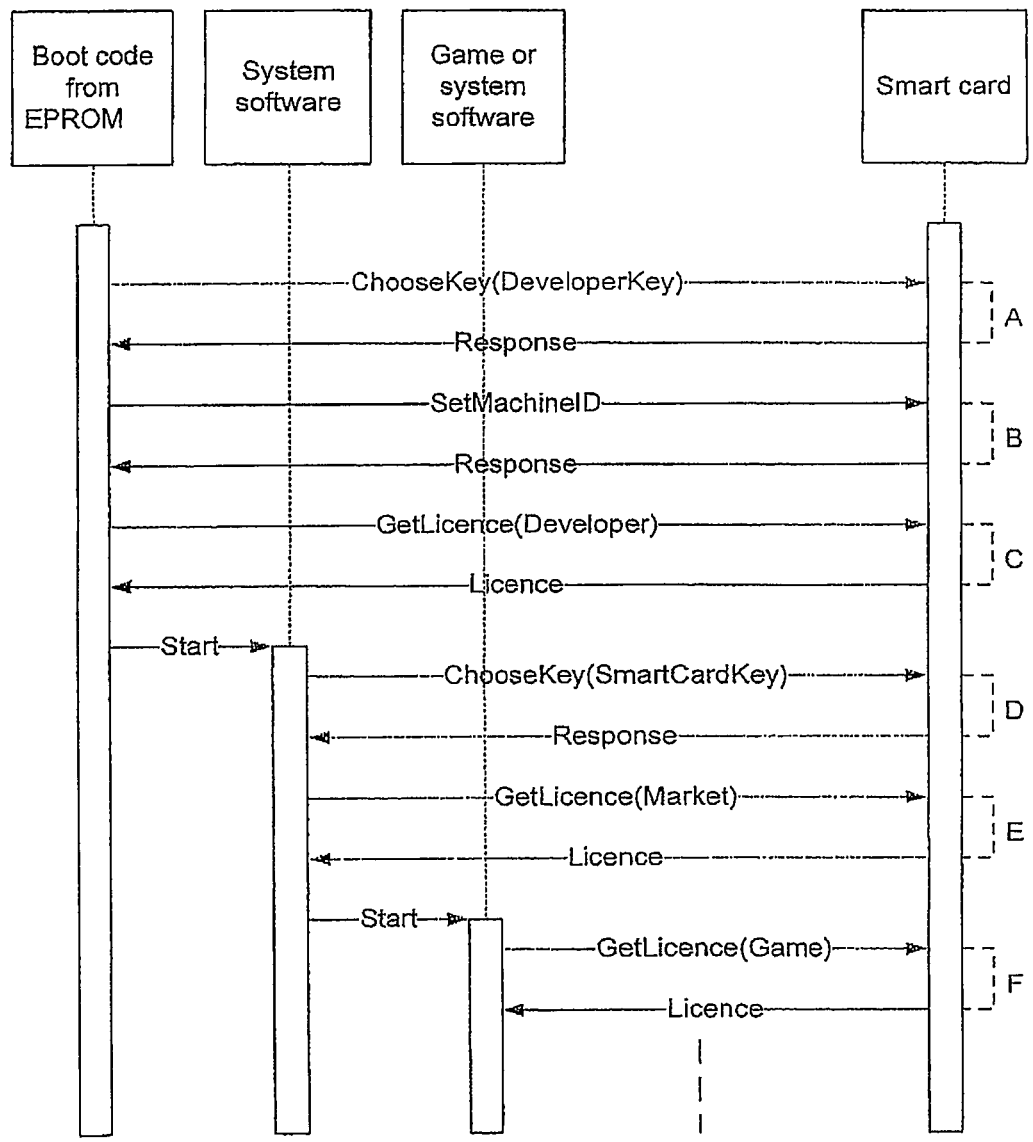
FIG. 6 is a process flow diagram in accordance with an embodiment.

FIG. 6 shows a sequence diagram of events according to an embodiment of the present invention in which public key encryption/authentication is used. Methods of public key encryption/authentication are described in U.S. Pat. Nos.

5,643,086 (Alcorn) and 6,722,986 (Lyons et al.), which are incorporated herein by reference.

The events shown in FIG. 6 are communication events between a smart card in the smart card reader 525 and the CPU 515. Communications are separated into phases when the CPU 515 is controlled by boot code in the EPROM 513, controlled by the system software (which has been verified as described previously herein) and when a game is to be played by the gaming machine. The communications that occur when a game is being played may be controlled by the system software or the game software depending on the particular implementation of the present invention.

The authorisation/licensing process is separated into six steps A-F. In steps A to C the CPU 515 is operating under the control of boot code in the EPROM 513, in steps D and E the CPU 515 is operating under the control of system software and in step F the CPU 515 is operating under the control of either system software or game software.

In step A, the gaming machine performs a ChooseKey operation. This operation sends a random number and the public key that is used to authenticate a signed message from a developer smart card (or regulator smart card). The smart card returns the random number signed with the private key. If the response is not signed correctly or if no response is received, an error has occurred and the CPU 515 either locks up or performs an error routine according to the boot code in EPROM 513.

Step A is optional, allowing the use of more than one public-private key pair. For example, step A enables a gaming machine store a plurality of public keys, with the current key being able to be revoked on the occurrence of an event and replaced with another key. The change of public key may cause at least some old smart cards to become inactive, while others may have multiple keys and therefore be able to accommodate the change. Also, step A enables different markets to have different key pairs, in which case gaming machines destined for different jurisdictions would have different public keys in them.

In step B the gaming machine performs a SetMachineID operation. This involves the CPU 515 retrieving and sending the identification information from the identifier 535 to the smart card. If the smart card is specific to a gaming machine, then it checks whether the received identification information matches the identification information in its memory. If there is not a match, the smart card sends a response indicating this to the gaming machine, which takes action as specified by the boot code in the EPROM 513. If there is a match, the smart card sends an acknowledgement back to confirm that the identification information has been received.

Step B may be performed during the first start-up of the machine following insertion of a smart card and performed after a smart card has been inserted in the machine for a predetermined period of time. The gaming machine may require execution of the part of the boot code that performs the SetMachineID operation periodically as described previously herein in relation to avoiding tampering with the gaming machine after the start-up checks have been completed. Where the smart card is initially gaming machine neutral, it may either immediately write the identification information into its memory to tie the smart card to the gaming machine, or only write the machine identification information into its memory after receiving the same identification information twice or some other predetermined number of times, thereby allowing a smart card to be moved to another machine if it was accidentally inserted in an incorrect machine.

In step C the gaming machine performs a GetLicense operation. The gaming machine generates a random number and specifies that it is inquiring as to whether the smart card has a developer license on it. This may be achieved by the gaming machine simply inserting the string "developer" into a predefined field in a message to the smart card, or otherwise. If the smartcard in the smart card reader 525 is a developer smart card 527, then it signs the random number and sends it back as a 'license' to the CPU 515. The CPU 515 then disables the signature checking on program executables (steps D, E, F and any others that may be provided). If no response or an incorrectly signed response is received, then the system continues booting normally so that the system software checks the signature on program executables.

Step D is similar to step A, except that it sends the public key for a license smart card instead of a developer smart card. Like step A it is optional. As with step A, the public key of a gaming machine may be unique to a jurisdiction. If the public key used for developer smart cards was the same in each jurisdiction and the public key for a license smart card different between jurisdictions, then the boot EPROM 513 could remain the same in each jurisdiction, with the system software varying instead.

Step E is similar to step C, except that the gaming machine is asking whether the smart card is able to authorise games for a given market. The gaming machine may store in EPROM 513 or elsewhere data that indicates what market it was manufactured for. Step E is optional and may be omitted where, for example, control over the transfer of gaming machines between jurisdictions is not required.

When a particular game is to be played on the gaming machine, then step F is performed, which is also a GetLicense operation. In step F, the gaming machine inserts into a message to the smart card data identifying the game for which a license is requested. This may be achieved by inserting a text string of the game name, or otherwise. If the smart card contains a license for the game, then it returns a signed license message. Again, to avoid a replay attack, the gaming machine includes a random number with the request and checks that the random number has been used to form the response message from the smart card.

Fifth Embodiment

Occasionally a game will need to be converted to an updated game. This may occur for example, when a new game EPROM is inserted into a gaming machine, a new game or game option is downloaded to the gaming machine. The new game may be major version change or an entirely new game, or an option may be added, for example enabling a game to participate in a progressive. The new game or game option may be bought or licensed separately and therefore require a different smartcard.

In the circumstances where the new game or game option is intended to replace the previous game, then a problem arises as to how to deal with the old smart card. One method to address this problem is to tie the smart card to the gaming machine as described previously herein. If the old smart card is tied to the gaming machine, then it can not be used on another gaming machine while the new smart card is used on the existing machine. However, in this solution the new license will need to be tied to the same gaming machine, requiring additional effort to ensure that the correct gaming machine identification information is used.

Figure 7:
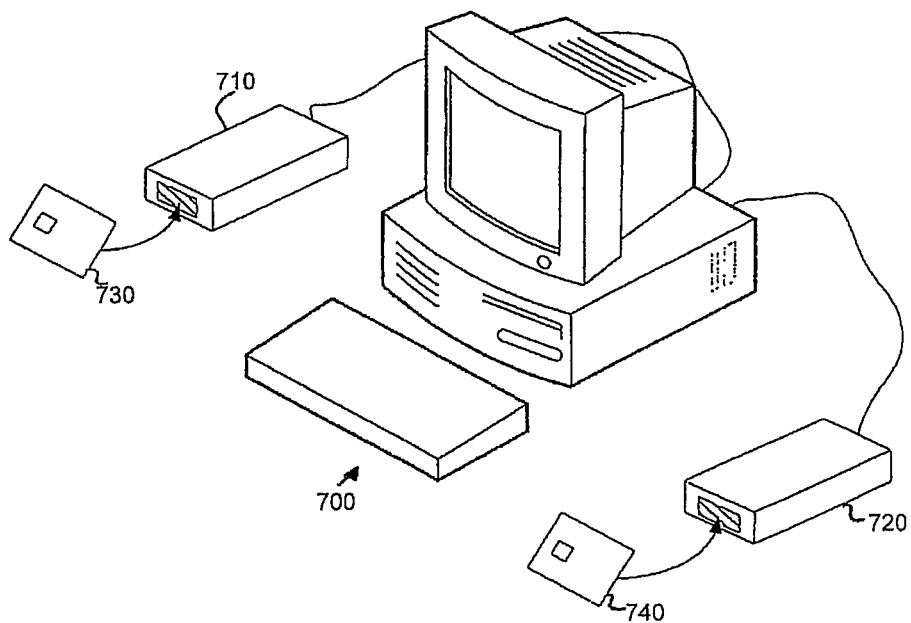
FIG. 7 is a diagrammatic view of a system for license updating in accordance with an embodiment.

Therefore, another method to address the problem of how to deal with the old smart card is to provide the ability to modify the old smart card in the field. FIG. 7 shows a personal computer 700 connected to two smart card readers 710, 720. A smartcard 730 that has the original authorization on it is inserted into the smart card reader 710 and an update smartcard 740 is inserted into the smartcard reader 720. The update smartcard 740 encrypts and digitally signs a message containing the new private key required to send a message authorising use of the new game or game option and sends it to the personal computer 700, which forwards the message to the smartcard 730. The smartcard 740 is restricted to a single update. For example, at the same time that the update smartcard 740 sends the message it may delete or otherwise disable its ability to send the private key again.

The smartcard 730 receives the signed message, authenticates it and if the message is authenticated, extracts the new private key for use when a gaming machine requests authorisation to play the new game or game option. The smartcard 730 may optionally delete the old private key, but need not do so, particularly if the gaming machine notifies the smartcard 730 what public key it has, in which case the smartcard 730 can use the appropriate license. This allows the smartcard 730 to be updated first and the gaming machine updated with the new game or game option at a later date.

Using the same method described above, a blank smartcard may be programmed to carry an authorisation for a game using a personal computer. If this process is carried by trusted personnel, then the update smartcard 740 may not necessarily be restricted to a single update.

The smartcard reader 710 may be the smartcard reader 525 (see FIG. 5), in which case the personal computer 700 may connect to smart card reader 525 through an appropriate connection.

The smartcard reader 720 may be located remote from the smartcard reader 710 and the two smartcards 730, 740 may communicate over a network.

Sixth Embodiment

Figure 8:
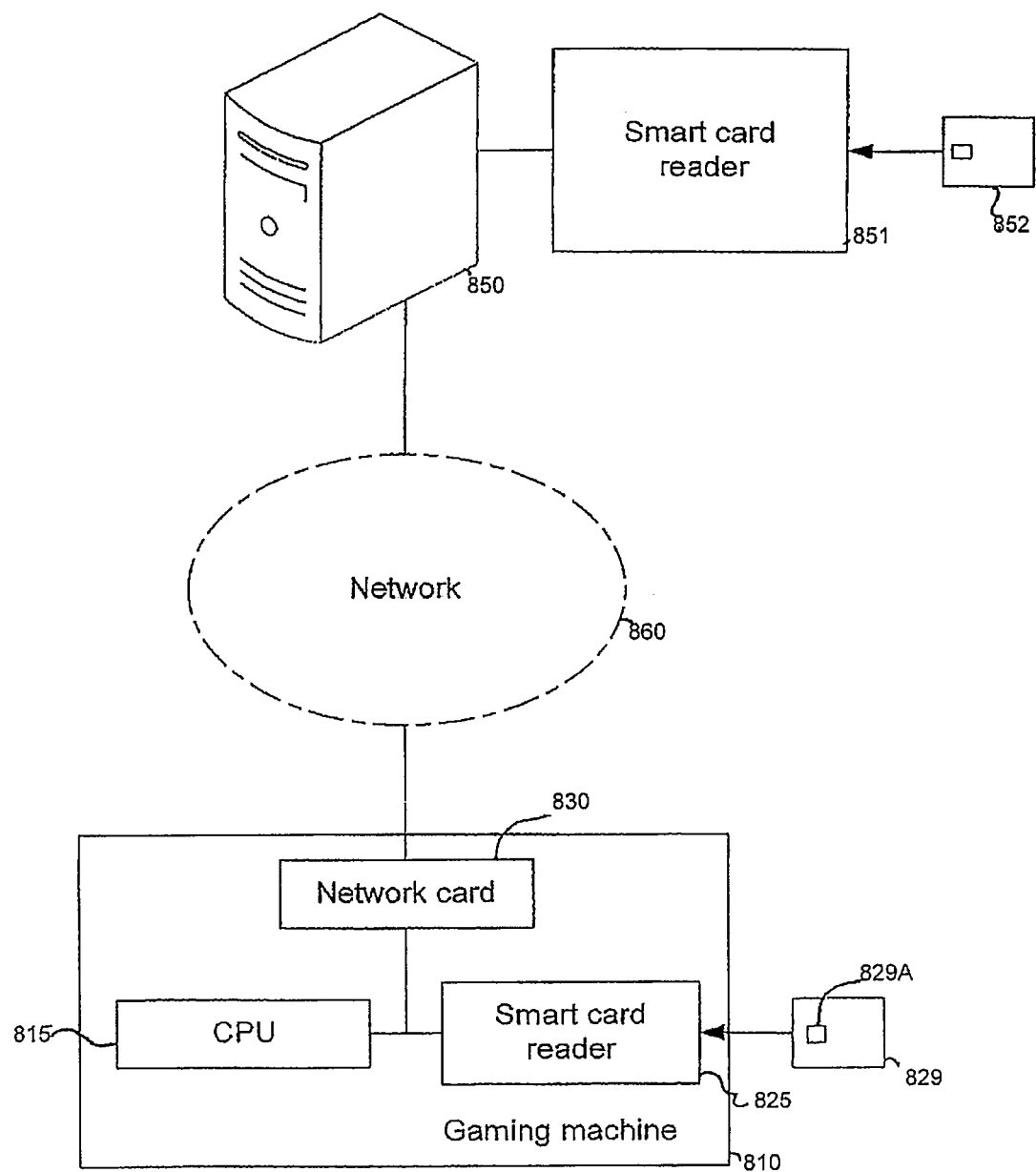
FIG. 8 is a diagrammatic view of a gaming system in accordance with an embodiment; an FIG. 9 is a process flow diagram in accordance with an embodiment.

FIG. 8 shows a diagrammatic representation of a gaming machine 810 connected to a server 850 through a network 860. The network 860 may for example be an Ethernet, although other types of networks may be used and the network 860 may include a wide area network. The server 850 includes a smart card reader 851.

A smart card 852 is provided to the operator of the gaming machine 810 and contains a license. In the most preferred embodiment the license is in the form of credit to the operator and any game that is supplied or authorised by the supplier of the license can use the license. The gaming machine 810 sends a request for a license to the server 850. Preferably, the request is encrypted, signed or both by a smart card 829. This helps ensure that the communication of the request for a license is secure and that the request is genuine. Alternatively, the gaming machine may encrypt or sign the request, although this is less preferred as it may be easier to extract a secret key from the memory of a gaming machine than it is to extract a key from a smart card.

The server 850 receives the request for a license, decrypts and/or authenticates the request and if the request is valid sends the request to the smart card 852. Preferably, the smart card 852 performs the step of decrypting and/or authenticating the request for a license, which may prevent the possibility of someone tampering with the server 850 to send fabricated license requests to the smart card 852.

The request for a license from the gaming machine 810 preferably contains an identifier of the gaming machine and a randomly generated number, both of which are provided to the smart card 825 and are incorporated into the request. This data is used by the smart card 852 to generate a response. The identifier of the gaming machine may be sourced from the identifier 35, which may be a chip or a circuit that provides a particular bit pattern unique to that machine. The identifier 835 may, for example, be on the motherboard of the gaming machine 810, on the backplane of the gaming machine 810, or comprise a combination of devices, one provided on the motherboard and one on the backplane, assuming they are different. The response is encrypted and/or signed and sent to the gaming machine 810 via the server 850 and the network 860.

The gaming machine 810 receives the response and either decrypts the response and/or authenticates the response itself or forwards the response to the smart card 829 for decryption and/or authentication. If the response is verified, then the game is authorised and game play allowed.

Thus in one embodiment the gaming machine 810 and the server 850 merely form part of a communication channel between the smart card 829 and smart card 852 and do not otherwise contribute to the licensing process. The gaming machine 810 may therefore temporarily suspend its own access to the smart card and act as a smart card reader proxy for the server 850. This takes advantage of the increased security of a smart card against unauthorised access to private information relative to the server 850 and gaming machine 810.

The response may cause the gaming machine 810 to set or increment a license counter, which decrements over time, for example in response to the elapsing of time or in response to game play of the licensed game. The rate of decrease of the counter (which could equally count up to a threshold), may be dependent on the particular game played, with each game including with the program code a specification of the rate that the gaming machine is to decrease the counter.

Where a license is charged according to the time that the game is licensed, or according to the revenue of the gaming machine attributable to a game, then the gaming machine may request a license for a game on a periodic basis. The request for a license can then include applicable license information, for example the time since the previous license request was made or the number of game plays since the last license request. The smart card 829 may then send, via the gaming machine 810, an encrypted and/or signed message to an administrator notifying of the use of the licensed game. The administrator may be a server, for example the server 850, connected to the network 50, or connected to the gaming 10 via a dedicated communication channel (not shown). The gaming machine may require the sending of revenue information before a new license can be requested.

The messages from the gaming machine 810 to the administrator may be chained as a check that all relevant information has been received. An example of chaining is to generate a hash of the previously sent revenue messages and include this in the current message.

In the network embodiment, the gaming machine 810 may include the smart card chip 829A instead of including a smart card reader 825 into which is inserted a smart card 829. The smart card chip 829A would operate in the same manner as the smart card 829 operates.

The smartcards described herein may suitably be LM Gemplus Java cards (GXPPro-R3) available from Gemplus. The smart card processes described herein may then be implemented by a Java Card applet. Those skilled in the relevant arts will appreciate that many possible alternative smart cards exist that may be used with the present invention and that alternative secure devices exist that could perform a like function.

Figure 9:
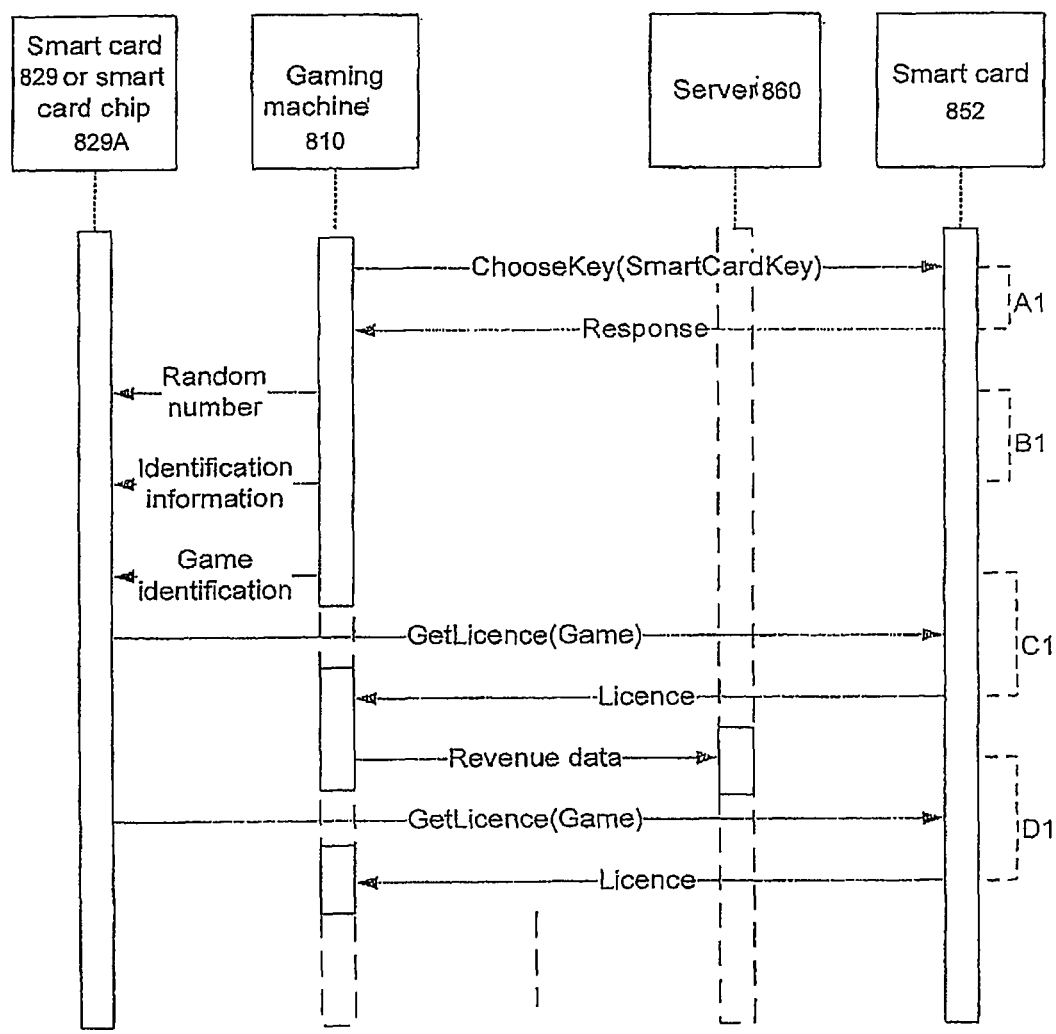

FIG. 9 shows a sequence diagram of the steps to obtain authorisation to execute a program or use a data file on the gaming machine 810.

In step A1, the gaming machine 810 performs a ChooseKey operation, which informs the smart card 852 at the server 850 of the public key that the gaming machine 810 has to decrypt/ authorise a game license message. Like step A described in relation to FIG. 6, step B1 is optional for the same reasons. The ChooseKey operation involves communication between the gaming machine 810 and the smart card 852, the server 850 only serving as part of the communication path and therefore the server 850 is represented in outline for step A1.

In step B1, the gaming machine 810 sends to the smart card 829 or smart card chip 29A a randomly generated number and identification information from the identifier 835. Step B1, or at least the sending of a randomly generated number may be repeated for each operation so that every operation uses a different random number.

For the remainder of the description of FIG. 9 it is assumed that the gaming machine 810 has a smart card reader with a smart card 829 inserted instead of having the smart card chip 829A mounted to a board in the gaming machine 810, the functions being equivalent in either case.

In step C1 the gaming machine 810 sends to the smart card 829 information identifying a program or file for which an authorisation to execute or use is required. Hereinafter it is assumed that the gaming machine 810 is requesting authorisation to play a particular game. The game may be one game provided in an EPROM in the gaming machine 810 or a game in the mass storage device 831, which may have been downloaded from a server such as server 850. The smartcard 829 then performs a GetLicense operation. As part of this, the smart card 829 sends a signed message to the smart card 852, the message contents including the random number, the identification information and identification of the game. The identification of the game may be a string of the game name, extracted from a predefined data field in program or file data loaded onto the gaming machine 810.

The smart card 852 receives the message and if the requested game is one that can be authorised, then the smart card 852 sends back to the gaming machine 810 a signed license message, which the gaming machine 810 authenticates using a public key before allowing the game to be executed. The authentication could alternatively be performed by the smart card 829, which then notifies the gaming machine 810 that the license has been authenticated.

If the license is time or play based, then the gaming machine 810 counts down the licensed time left and once the license has expired step C1 is repeated. The gaming machine 810 may be able to continue executing a game for a predefined "grace" period after expiry of a license to accommodate a delays that may be experienced in receiving a license message from the server 860/smart card 852.

If payment for the license is based on revenue, then when the license expires step D1 is performed, in which the gaming machine 810 sends revenue data to a server, which may be the server 850. Only then can the gaming machine 810 request the smart card 829 to perform another GetLicense operation. Step D1 is repeated each time the periodic license expires.

Persons skilled in the art will appreciate that various of the above embodiments may be combined. Further various embodiments may be modified by other embodiments.

Various other modifications will be apparent to persons skilled in the art and should be considered as falling within the scope of the invention described herein.

The invention claimed is:

1. A method of protecting game program code of an electronic gaming machine (EGM) comprising:
   determining prior to execution of the game program code whether there is a dongle in data communication with the EGM that contains a valid game token corresponding to the game program code;
   taking at least one protective action if a valid game token is determined not to be contained in the dongle;
   periodically altering a counter on the dongle associated with the game token wherein the game token remains valid until the counter reaches a predetermined value to thereby control the lifetime of the game token;
   monitoring an amount of time the EGM has been in data communication with the dongle determined to contain a valid game token; and
   in response to the monitored amount of time being greater than a. predetermined amount of time, tying the dongle to the EGM, said tying including writing identification information of the EGM into the dongle.

2. A method as claimed in claim 1 wherein the protective action is to prevent execution of the game program code.

3. A method as claimed in claim 1 comprising determining whether the dongle is valid.

4. A method as claimed in claim 3, wherein determining whether the dongle is valid comprises:
   obtaining from the dongle a dongle public key and a dongle signature of the dongle public key encrypted with a master private key;
   decrypting the dongle signature with a master public key; and
   determining based on a comparison of the decrypted dongle signature with the dongle public key whether the dongle is valid.

5. A method as claimed in claim 1, wherein determining whether a game token is valid comprises:
   sending a game ID to the dongle;
   obtaining from the dongle game data of the game token corresponding to the game ID;
   obtaining from the dongle a game signature of the game ID and the game data encrypted with the dongle private key;
   decrypting the game signature with the dongle public key; and
   determining whether the game token is valid based on a comparison of the decrypted game signature with the game ID and game data.

6. A method as claimed in claim 1 wherein a plurality of game programs stored in a memory of the EGM and the method comprises determining whether there is a dongle that contains a valid game token for each game and taking at least one protective action in respect of each game program for which a valid token is not located and no protective action in respect of each game program for which a valid token is located.

7. A method as claimed in claim 1 wherein the dongle is a smart card.

8. A method as claimed in claim 1, and wherein a plurality of game programs are provided in the memory of the EGM, the method further comprising:
   connecting a plurality of dongles to the EGM, each corresponding to one game program of the plurality of game programs; and
   taking at least one protective action in respect of execution of any game program that does not have a corresponding dongle connected to the EGM.

9. A method as claimed in claim 1 comprising altering the counter in response to execution of the game program code.

10. A method as claimed in claim 1 comprising altering the counter by decrementing the counter until the counter reaches zero.

11. An electronic gaming machine (EGM) comprising:
   a memory storing one or more game programs; and
   a main circuit in data communication with the memory and arranged to determine prior to execution of a game program of the one or more game programs whether the main circuit is in data communication with a dongle containing a valid token for the game program and further arranged to take at least one protective action in respect of the game program if a dongle containing a valid token is determined not to be contained in the dongle, and wherein the electronic gaming machine is configured to periodically alter a counter on the dongle associated with the token and wherein the token remains valid until the counter reaches a predetermined value to thereby control the lifetime of the token, and wherein one of the dongle and the EGM monitors an amount of time the EGM has been in data communication with the dongle determined to contain a valid game token, and wherein in response to the monitored amount of time being greater than a predetermined amount of time, one of the dongle and the EGM writes identification information of the electronic gaming machine is written into the dongle thereby tying the dongle to the electronic gaming machine.

12. An electronic gaming machine as claimed in claim 11 wherein the main circuit is adapted to have a plurality of dongles connected thereto.

13. An electronic gaming machine as claimed in claim 12 wherein the memory stores a plurality of game programs the main circuit is adapted to determine whether there is a dongle with a valid token for each game program during a boot operation of the main circuit.

14. An electronic gaming machine as claimed in claim 11 wherein the dongle is a smart card.

15. An electronic gaming machine as claimed in claim 11 wherein the electronic gaming machine is configured to alter the counter in response to execution of the game program.

16. An electronic gaming machine as claimed in claim 11 wherein the electronic gaming machine is configured to alter the counter by decrementing the counter until the counter reaches zero.

17. A method of selectively allowing software development on an electronic gaming machine comprising:
performing a boot operation of an electronic gaming machine (EGM);
determining during the boot operation whether there is a dongle in data communication with the EGM that contains a valid developer token;
disabling at least one security function of the EGM when a valid developer token determined not to be contained in the dongle;
controlling the lifetime of the developer token by periodically altering a counter on the dongle associated with the developer token such that the developer token remains valid until the counter reaches a predetermined value;
monitoring an amount of time the EGM has been in data communication with the dongle determined to contain a valid game token; and
in response to the monitored amount of time being greater than a predetermined amount of time, tying the dongle to the EGM, said tying including writing identification information of the EGM into the dongle.

18. A method as claimed in claim 17 wherein determining whether a developer token is valid comprises:
sending a developer ID to the dongle;
obtaining, from the dongle, developer data of the developer token corresponding to the developer ID;
obtaining, from the dongle, a developer signature of the developer ID and the developer data encrypted with the dongle private key;
decrypting the developer signature with the dongle public key; and
determining whether the developer token is valid based on a comparison of the decrypted developer signature with the developer ID and developer data.

19. A method as claimed in claim 17 comprising altering the counter upon disabling of the at least one security function.

20. A method as claimed in claim 17 comprising altering the counter by decrementing the counter until the counter reaches zero.

21. An electronic gaming machine (EGM) comprising:
a main circuit arranged to determine during a boot operation whether there is a dongle in data communication with the EGM that contains a valid developer token, and further arranged to disable at least one security function of the EGM when a valid developer token determined not to be contained in the dongle, and
wherein the EGM is configured to determine whether the developer token is valid at least in part by determining whether a counter on the dongle associated with the token has reached a predetermined value and is further configured to periodically alter the counter to thereby control the lifetime of the dongle, and
wherein at least one of the dongle and the EGM monitors an amount of time the EGM has been in data communication with the dongle determined to contain a valid game token, and
wherein in response to the monitored amount of time being greater than a predetermined amount of time, one of the dongle and the EGM writes identification information of the EGM into the dongle thereby tying the dongle to the electronic gaming machine.

22. An EGM as claimed in claim 21 wherein the EGM is configured to alter the counter upon the main circuit disabling the at least one security function.

23. An EGM as claimed in claim 21 wherein the EGM is configured to alter the counter by decrementing the counter until the counter reaches zero.

24. An electronic gaming machine (EGM) comprising:
a main circuit arranged to determine prior to execution of game program code whether there is a dongle in data communication with the EGM that contains a corresponding game token, and further arranged to determine whether to enable at least one feature of the game program code when a valid corresponding game token determined not to be contained in the dongle, and
wherein the EGM is configured to periodically alter a counter on the dongle associated with the game token and wherein the game token remains valid until the counter reaches a predetermined value to thereby control the lifetime of the game token, and
wherein at least one of the dongle and the EGM monitors an amount of time the EGM has been in data communication with the dongle determined to contain a valid game token, and
wherein in response to the monitored amount of time being greater than a predetermined amount of time, one of the dongle and the EGM writes identification information of the electronic gaming machine into the dongle thereby tying the dongle to the electronic gaming machine.

25. An EGM as claimed in claim 24 wherein the EGM is configured to alter the counter upon a determination by the main circuit to enable the at least one feature of the game program code.

26. An EGM as claimed in claim 24 wherein the EGM is configured to alter the counter by decrementing the counter until the counter reaches zero.

\* \* \* \* \*